United States Patent [19]

Blackwood

[11] Patent Number: 4,497,635
[45] Date of Patent: Feb. 5, 1985

[54] SULFUR REMELTING

[76] Inventor: Rodger Blackwood, R.R. 1, DeWinton, Alberta, Canada, T0L 0X0

[21] Appl. No.: 446,031

[22] Filed: Dec. 1, 1982

[51] Int. Cl.³ .............................................. E21C 41/14
[52] U.S. Cl. ...................................... 23/308 S; 299/6
[58] Field of Search ........................... 23/308 S, 308 R; 423/567 A, 578 R, 578 A, 658.5; 422/262, 285; 299/6, 14; 239/10

[56] References Cited

U.S. PATENT DOCUMENTS

| | | | |
|---|---|---|---|
| 1,421,416 | 7/1922 | Davis et al. | 23/308 S |
| 2,409,408 | 10/1946 | Tweeddale | 422/262 |
| 2,754,098 | 7/1956 | Heinze | 299/6 |
| 4,050,740 | 9/1977 | Ellithorpe | 299/6 |
| 4,111,805 | 9/1978 | Pool et al. | 423/578 R |
| 4,171,200 | 10/1979 | Jagodzinski et al. | 299/6 |
| 4,234,318 | 11/1980 | Higgins et al. | 23/293 A |

FOREIGN PATENT DOCUMENTS

| | | | |
|---|---|---|---|
| 1091430 | 12/1980 | Canada | 23/308 S |
| 1067006 | 10/1959 | Fed. Rep. of Germany | 423/567 |

Primary Examiner—Hiram H. Bernstein
Attorney, Agent, or Firm—Kokjer, Kircher, Bradley, Wharton, Bowman & Johnson

[57] ABSTRACT

This invention is directed to a novel sulfur remelting method and an apparatus for employing the method. The method of remelting sulfur from a solid sulfur block may be comprised of generating super-heated liquid sulfur, spraying the super-heated liquid sulfur on the face of the solid sulfur block to thereby melt sulfur from the face of the block, and collecting the liquid sulfur generated in a collecting tank which maintains the sulfur in a liquid condition. The apparatus utilized for remelting sulfur from a solid sulfur block may comprise means for generating super-heated liquid sulfur and spray means for directing the super-heated liquid sulfur at high velocity at the face of the block to melt sulfur from the face of the block.

10 Claims, 8 Drawing Figures

SULFUR REMELTING

FIELD OF THE INVENTION

This invention is directed to a novel sulfur remelting method and an apparatus for employing the method. More particularly, this invention is directed to a novel method and apparatus for remelting sulfur from large blocks of solid sulfur cast from liquid sulfur obtained as a by-product in the production of oil and natural gas.

BACKGROUND OF THE INVENTION

Many petroleum reservoirs in the earth, when tapped by conventional oil and gas-well drilling techniques, yield "sour" oil and gas. The oil and gas are termed "sour" because of the presence therein of numerous sulfur-based compounds such as hydrogen sulfide and sulfur dioxide.

To be commercially useful, the oil and/or gas must be "sweetened" which requires removal of the sulfur-based substances from the oil and gas. The sulfur-based compounds are usually reduced to elemental sulfur in order to provide a marketable commodity. When sulfur markets are soft, the excess quantities of sulfur extracted from sour natural gas and oil are typically melted and stored in the field or in the immediate vicinity of the gas or oil production plant by casting the sulfur layer by layer in the same manner as concrete into large blocks. In Alberta, for example, many sulfur blocks cast in this way may measure one to three hundred yards in length, one to two hundred yards in width and ten to fifteen yards in height. It is estimated that in Alberta alone, there are about 18 million tons of sulfur cast in block form in the field.

Storage as solid blocks is advisable because storage in powder form can be an environmental and safety hazard. Sulfur dust, when blown by the wind, can cause environmental damage to surrounding property by creating an acidic environment which contributes to soil breakdown, which is detrimental to farming and ranching. Sulfur dust is also potentially explosive and a fire hazard.

Sulfur has important commercial value as a starting material in a wide range of chemical processes and as a fertilizer. However, since transportation to various markets of sulfur in large block form is uneconomical, it is necessary to reduce such blocks into tractable portions. Simple mechanical means for the breaking up of sulfur blocks in situ, for example, crushing devices, cutting means such as saws, or even explosives, have been employed in the past. But all such methods have been found to generate a large amount of undesirable sulfur dust. Furthermore, mechanical break-up of block sulfur is a relatively expensive procedure and yields pieces of irregular size, thereby detracting from handling efficiency and raising costs.

In recent years, in response to increasingly stringent environmental anti-pollution standards imposed by applicable regulatory bodies, apparatus and methods have been developed for melting sulfur from the large blocks of stored sulfur. The method usually involves contacting the sulfur block with a solid hot element heated electrically, or by internally circulated heating fluid. The melted sulfur obtained can then be transported, either in liquid form, or as re-cast uniform solid pellets. This type of apparatus is usually described as a "sulfur remelter". Examples of such apparatus are illustrated in U.S. Pat. No. 4,050,740, issued Sept. 27, 1977, Ellithorpe, U.S. Pat. No. 4,203,625, issued May 20, 1980, Ellithorpe, Canadian Pat. No. 1,040,037, issued Oct. 10, 1978, Bowman and Canadian Pat. No. 1,070,928, issued Feb. 5, 1980, Potts et al.

The sulfur remelters disclosed in these patents employ a sulfur melting technique which involves positioning a heating element in contact with a sulfur block and moving the element into the block as melted sulfur is removed, either by gravitational flow or by suction. A serious disadvantage of such melting devices and the overall technique is that the melting action is slowed or stopped by impurities or obstructions in the solid sulfur block. These impurities may be items such as steel forming spikes, wood planks, shovels, or other solid objects which were used when the sulfur was cast. Stones, pebbles, sand and dirt are other common impurities. In certain instances, it is necessary to withdraw the remelter from the block face, and remove the obstruction before remelting can be continued.

Another disadvantage is that existing sulfur remelting methods are incapable of melting sulfur blocks to ground level, or cannot deal with sulfur blocks cast on uneven ground. Pads or ground deposits of solid sulfur of one foot or more in thickness remain after using the conventional remelters as described, even on level ground. Also, where deposits are on uneven ground, for example, the ground may be fifteen or more feet higher at one end than the other end, the pads left in place may be generally wedge-shaped. It is necessary in such situations to melt the blocks in steps which thus leaves a stepped pad on the ground. Leaving sulfur pads in place after remelting the bulk of the sulfur is unacceptable both from an economic standpoint and an environmental standpoint. It is estimated that about 2 million tons of sulfur will remain as pads after conventional sulfur remelters have removed the upper portions of the existing stored sulfur blocks in Alberta.

The melting of block sulfur by direct contact with a solid heating element also presents a number of practical difficulties which arise from the peculiar physical-chemical properties of elemental sulfur. Solid sulfur raised from an ambient temperature begins to melt over a narrow temperature interval centred about 240° F. (115° C.). Above that point, as with most liquids, the viscosity of the liquid sulfur decreases with increasing temperature until a minimum liquid sulfur viscosity is attained at about 310° F. (155° C.). Above about 310° F. (155° C.), however, the liquid sulfur undergoes a phase transformation over a relatively small temperature range which causes the viscosity of the liquid sulfur to increase sharply such that the sulfur becomes syrupy and sticky. The viscosity values for liquid sulfur at 250° F. (120° C.), 300° F. (150° C.), 330° F. (165° C.) and 450° C. (230° C.) are 12, 7.5, 60 and 300 centipoises respectively. This sharp increase in viscosity causes serious handling problems.

Another problem in dealing with sulfur is that it is a poor conductor of thermal energy, particularly in the liquid state. Furthermore, the thermal conductivity of the sulfur in the liquid state varies with temperature. Consequently, when a solid heating element is placed in contact with a block of sulfur, the liquid sulfur initially formed has the effect of insulating the underlying sulfur from the thermal energy of the heating element. Increasing the temperature of the heating element to drive heat across the insulating liquid boundary layer into the solid sulfur only tends to aggravate the situation, because, as the molten sulfur boundary layer rises in temperature, it undergoes the thickening phase transition stage mentioned above. This thickened sulfur coats the heating element thereby causing a further heat barrier which does not readily flow away. Conventional sulfur remelters, because of these problems, tend to be inefficient and have a high energy expenditure for the amount of sulfur remelted.

Finally, since the conventional sulfur remelters are inefficient and expensive to operate, the sulfur is not superheated to any appreciable extent. The liquid sulfur thus has little surplus heat capacity and is therefore prone to freeze quickly in cold or rainy weather which aggravates handling problems. Frozen sulfur lines must be thawed before they can be used again.

SUMMARY OF THE INVENTION

I have invented an efficient relatively low-cost method and apparatus for remelting sulfur from solid sulfur blocks utilizing superheated liquid sulfur which is sprayed under high pressure against the face of the sulfur block. The melted liquid sulfur is collected in a storage or holding tank.

The principles underlying this invention are two-fold: (1) The propulsion at high velocity of a turbulent free spray of super-heated liquid sulfur at the face of the solid sulfur block, or pad, to provide a hydraulic mining action under ambient conditions, and; (2) The use of heat inherent in the super-heated liquid sulfur to supply energy to the solid sulfur at the face of the solid sulfur block, or pad, to thereby melt the solid sulfur into a liquid.

With the present invention, the problem of creating a viscous liquid sulfur insulating boundary layer is overcome because the melted sulfur is physically washed away. The transfer of melt heat into the sulfur block is effectively achieved by spraying super-heated liquid sulfur under high pressure as a turbulent liquid on the face of the sulfur block or pad. The resultant impact and stored super heat in the sprayed liquid sulfur promotes efficient transfer of heat into the block sulfur and liquifies a layer of sulfur from the surface of the block. Since a layer of sulfur is being continuously washed away, fresh solid sulfur is continuously exposed to the high pressure melting liquid.

The method of remelting sulfur from the face of a solid sulfur block may be comprised of generating super-heated liquid sulfur and spraying the super-heated liquid sulfur on the face of the sulfur block to thereby melt and remove sulfur from the face of the block. The melted sulfur and the circulated sulfur may be collected in a collecting tank which maintains the sulfur in a liquid condition. The super-heated liquid sulfur used for spraying may be heated to a temperature of at least 250° F. (120° C.), and preferably of at least 275° F. (135° C.), and sprayed against the solid sulfur block face under a pressure preferably of at least 75 psig. The temperature selected in each application is partially dependent upon the temperature of the sulfur block to be melted, ambient temperatures and the degree of heat that is desired to be imparted into the sulfur block to optimize melting action. The pressure selected is dependent upon the degree and extent of mechanical sulfur mining action that is desired, the rate of liquid sulfur flow required to optimize the sulfur melting action, the porosity of the sulfur to be melted and the degree of agitation required to maximize transfer of heat into the sulfur to be melted.

The apparatus utilized for remelting sulfur from a solid sulfur block comprises means for generating super-heated liquid sulfur and spray means for directing the super-heated liquid sulfur at the face of the sulfur block to melt sulfur from the face of the block. The spray means may comprise a housing having a plurality of spray nozzles therein and heating means for maintaining the temperature of molten sulfur within the housing at about at least 250° F. (120° C.). The apparatus may include a collection tank for collecting and containing the liquid sulfur produced by the melting action of the liquid sulfur sprayed on the sulfur block from the spray means. The apparatus may also include first pumping means for withdrawing liquid sulfur from the collection tank and a holding tank for receiving the liquid sulfur from the first pumping means. The holding tank may comprise heat exchange means for heating and holding the temperature of the liquid sulfur received from the first pumping means at above about 275° F. (135° C.). The apparatus may also include a second pumping means for withdrawing liquid sulfur from the holding tank, storage means for receiving and holding the liquid sulfur pumped by the second pumping means and means for dividing the output of the liquid sulfur from the second pumping means in predetermined proportion between the spray means and the storage means. A filter may be included in the system for filtering impurities from the liquid sulfur melted from the sulfur block.

DRAWINGS

DETAILED DESCRIPTION OF AN EMBODIMENT OF THE INVENTION

Figure 1:
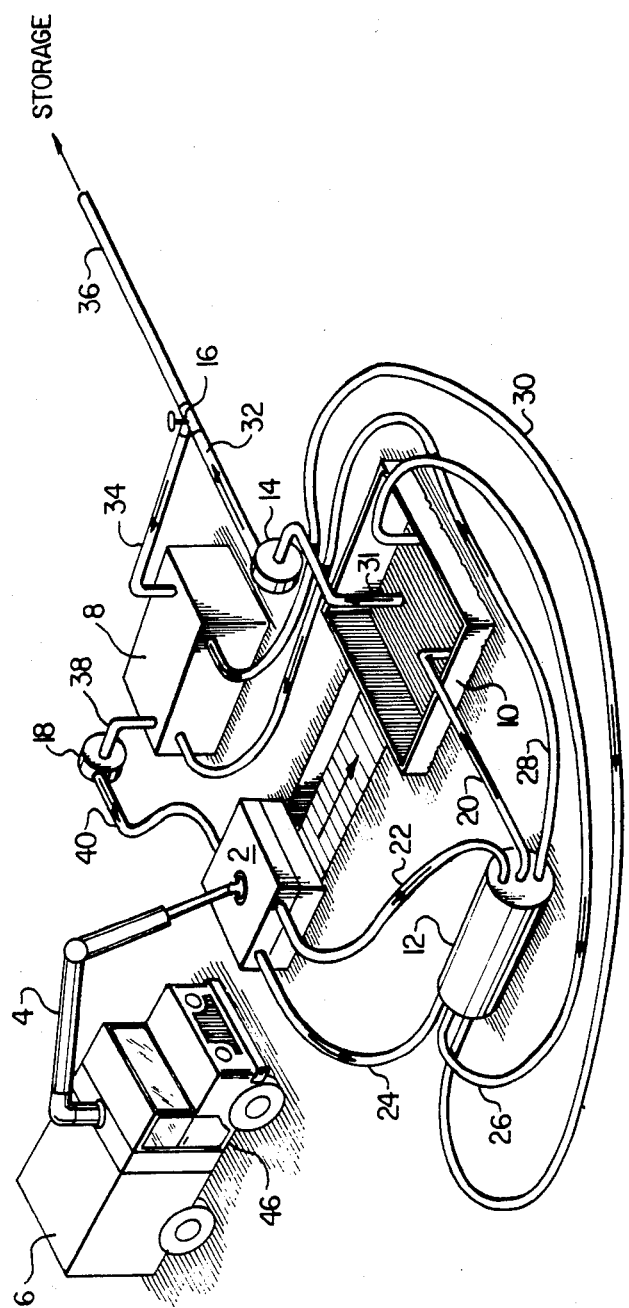
FIG. 1 represents a perspective view of the block sulfur remelting apparatus including heat exchanger and storage tank melting solid sulfur from a sulfur pad.

Referring to FIG. 1, a grid housing 2 used to spray super-heated liquid sulfur onto a pad of block sulfur is carried and moved about by a hydraulic arm 4 which is mounted on a truck 6. The truck 6 rests upon a large pad of block sulfur. The liquid sulfur sprayed within the grid housing 2 is drawn from heat exchanger 8. A collecting sump 10 is sunk into the pad of block sulfur and collects by gravity flow liquid sulfur that is sprayed by the grid housing 2 and liquid sulfur that is melted from the block sulfur pad. A steam generator 12 generates steam used to heat the various components of the overall sulfur melting system.

A sump pump 14 draws liquid sulfur from the sump 10 by means of inlet line 31 and pumps it through outlet line 32. The liquid sulfur is divided by means of adjustable valve 16 so that part of the liquid sulfur travelling through outlet line 32 goes to liquid storage along storage line 36, the other part being directed along heat exchanger inlet line 34 into heat exchanger 8.

The liquid sulfur after passing through and being heated by heat exchanger 8 is withdrawn by grid pump 18 through grid pump inlet line 38 and pumped under pressure through grid supply line 40 to the grid housing 2. The liquid sulfur (which is super-heated) is then sprayed under high pressure and velocity onto the solid sulfur pad by means of grid housing 2.

In order to maintain the liquid sulfur at all points in super-heated form, steam generator 12 supplies super-heated steam (at least 250° F. (115° C.)) along various steam supply lines to all key points of the system. For instance, a steam supply line 22 leads to grid housing 2 in order to maintain the liquid sulfur being sprayed in the grid housing 2 in super-heated form. Exhausted steam is returned to the steam generator 12 by means of low pressure steam line 24.

A second circuit of steam involves heating the liquid sulfur in sump 10 by means of high pressure steam line 20 which, after being circulated through steam coils (not shown) located at the bottom of sump 10 below the surface level of the liquid sulfur returns to steam generator 12 by means of low pressure steam line 26.

A third steam circuit is used to super-heat the liquid sulfur in heat exchanger 8. Steam under high pressure is supplied to heat exchanger 8 along heat exchanger steam line 28 and after passing through steam coils (not shown) located in heat exchanger 8, is returned to the steam generator 12 along low pressure steam line 30. The steam generator 12 can be designed so that it supplies high pressure steam which is delivered by respective lines to the various use areas before the exhausted steam is returned to the steam generator 12 after required heat has been withdrawn from the steam. If pressures generated by the steam generator 12 are not sufficient for the purpose required, an auxiliary steam pump (not shown) can be installed on the high pressure side of the steam generator 12 to circulate the steam. In certain locations, there may be an auxiliary supply of high pressure steam available, in which case it is not necessary to have steam generator 12.

Figure 2:
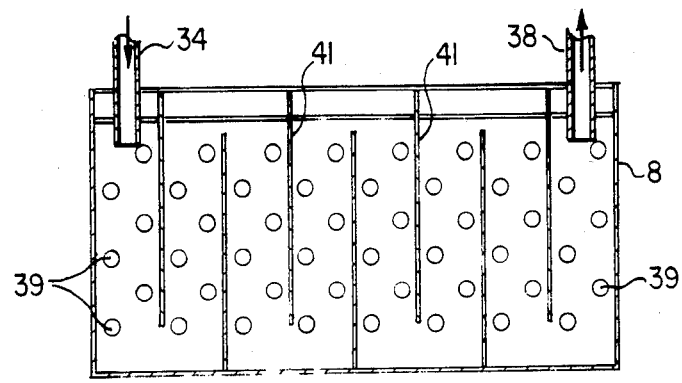
FIG. 2 represents a side elevation cut-away view of the interior of a liquid sulfur-steam heat exchanger.

FIG. 2 depicts a side elevation cut-away view of the interior of the heat exchanger 8. As can be seen, the interior space of the heat exchanger 8 is divided into a number of confined areas connected in zig-zag series by vertically extending baffles 41. The baffles 41 alternate with one another in that the odd numbered baffles are sealed to the top of the heat exchanger 8, while the even numbered baffles are sealed to the bottom of the heat exchanger 8. A number of steam coils 39 are arranged in staggered pattern in the areas between the various baffles 41.

Liquid sulfur is pumped into the heat exchanger 8 through heat exchanger sulfur inlet line 34. By means of the staggered arrangement of baffles 41, the sulfur is obliged to pass along a switch-back pattern throughout the interior of the heat exchanger 8 until it reaches grid pump inlet line 38. In doing so, the liquid sulfur is super-heated by means of heat exchanged with super-heated steam passing through the steam coils 39. The liquid sulfur is thus in super-heated form as it departs through grid pump inlet 38.

It can be recognized that alternative arrangements of baffles, steam coils, and indeed basic heat exchanger design, can be utilized so long as the heat exchanger functions efficiently in super-heating the liquid sulfur passing through the exchanger.

Figure 3:
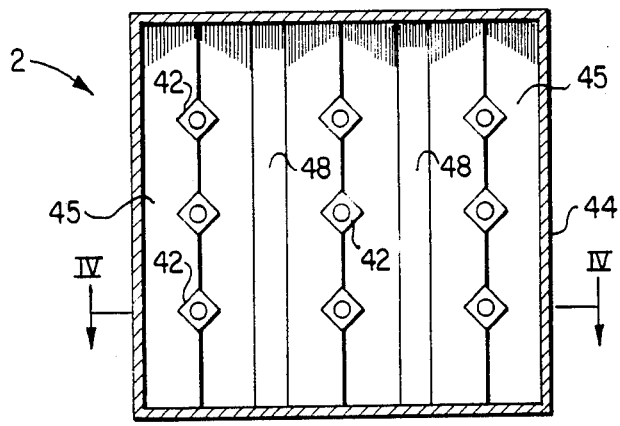
FIG. 3 represents a bottom elevation view of a grid housing and nozzles used in spraying liquid sulfur.

FIG. 3 represents a bottom elevation view of a grid housing 2 used in spraying super-heated liquid sulfur. In the design shown, the grid housing 2 is basically of square configuration, with a plurality of grid sulfur nozzles 42 spaced over the bottom surface of the grid housing 2. FIG. 3 shows nine nozzles 42. The apertures in these nozzles should be sized in inverse relationship to the pressure drop from nozzle to nozzle to equalize the velocity of the spray that is emitted from each nozzle 42. As shown in FIG. 3, the nine nozzles 42 are arranged in three rows of three. The nozzles 42 are backed by baffles 45 which are folded in a general accordion manner so as to assist in directing the spray emitted by each nozzle 42 in an even pattern. The main purpose of the baffles 45 is to confine the sulfur spray to the immediate work area and prevent sulfur splashback. The areas of the baffles 45 between the three rows of nozzles 42 have built in overlap faces 48 to permit some overlapping of the spray from adjacent nozzles at these locations. This ensures that the solid sulfur is melted away at all points and obstructing peaks do not occur.

Figure 4:
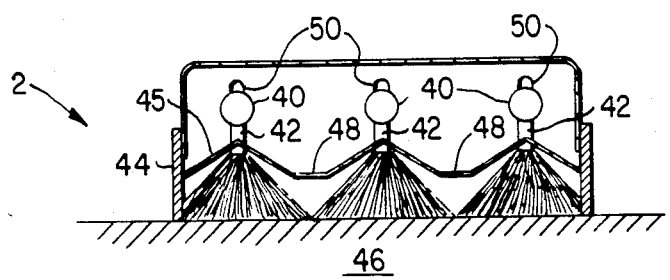
FIG. 4 represents a section view taken along section line A—A of FIG. 3.

FIG. 4, which represents a section view taken along Section A—A of FIG. 3, illustrates the manner in which the super-heated liquid sulfur is emitted under high pressure through the nozzles 42 so as to provide an even spray pattern onto the face of the solid sulfur pad 46. Super-heated liquid sulfur is supplied to the respective nozzles 42 through grid sulfur supply lines 40, which are connected by pump 18 to inlet line 38. The sulfur supply lines 40 have grid sulfur steam lines 50 welded along the length of each of the respective grid sulfur supply lines 40. Heat transmitted via the steam lines 50 maintains the liquid sulfur in the lines 40 in super-heated condition. Indeed, for trouble-free operation and to keep the sulfur in super-heated state in all exposed sulfur carrying lines, it is advisable to have adjacent steam lines carrying super-heated steam welded or fastened to the sulfur lines. Likewise, the sulfur pumps should have steam jackets which carry super-heated steam.

The accordion-like arrangement of the baffles 45 together with the overlap faces 48, as discussed previously in association with FIG. 3, can be readily seen in FIG. 4. A skirt 44 made of heat resistant rubber, or some other flexible suitable material, surrounds the base of the grid housing 2. This skirt 44 ensures that the super-heated liquid sulfur sprayed from the various nozzles 42 is confined within the grid housing 2 and is directed at the block sulfur pad 46. In this way, the occurrence of incidental super-heated liquid sulfur spray is virtually eliminated. Unconfined liquid sulfur mist is to be avoided as much as possible because it tends to coat out on cold solid objects and penetrate clothing and the nostrils of workmen.

The nozzles 42 can be of any suitable design which provides an equalized square spray pattern so that all areas within the confines of the base of the grid housing 2 receive an equal amount of sprayed super-heated liquid sulfur. The face of the solid sulfur pad 46 is then removed at an equal rate thereby eliminating down time. The applicant has found in prototype tests that one inch flood-jet nozzles obtained from T-Jet Spray Systems, Illinois, U.S.A., have been satisfactory. These nozzles spray in equalized square pattern. Of course, other types and sizes of nozzles may also perform satisfactorily.

When the large solid sulfur storage blocks in Alberta and adjoining oil and gas producing areas were cast originally, as mentioned previously, they were usually cast upon unprepared, uneven, bare grass or shrubbery bearing ground. Thus, the bases of these blocks may be hilly or sloping. Moreover, debris such as forming spikes, pebbles, stones, grass, pieces of wood, sand, clay, rabbits, prairie dogs, ash or carbon and other solid non-meltable materials are cast into the solid blocks. These solid materials detract from the quality of the cast sulfur and lower or destroy the commercial value of the sulfur. In order to produce liquid sulfur of commercial grade, that is, approximately 99.5% purity, when the solid sulfur block is melted, it is therefore necessary to economically remove such solid material from the liquid sulfur.

Figure 5:
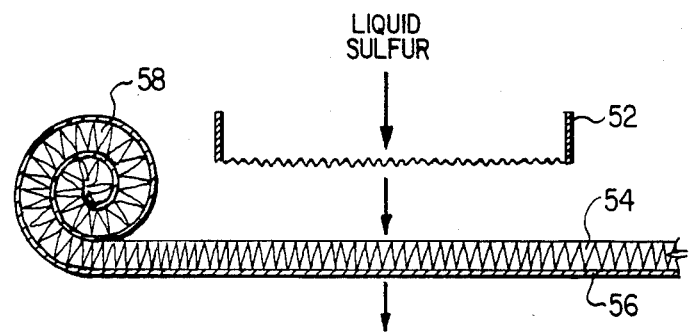
FIG. 5 represents a side elevation view of a liquid sulfur filtering apparatus.

The filtering arrangement illustrated in FIG. 5 provides a relatively simple, efficient economical apparatus for filtering solid debris from the super-heated liquid sulfur before it is pumped into storage tanks for ultimate shipment to market. Super-heated liquid sulfur is first pumped through a solid vibrating stainless steel screen 52 which serves to remove large solid articles such as grass, pebbles, stones, wood, spikes, and the like. Then, once the liquid sulfur passes through the screen 52, it passes through a porous fibreglass layer 54. This fibreglass layer 54 can be commercial grade 4-inch fibreglass normally used as an insulation material in conventional buildings. Of course, some other generally inert porous material may be formed suitable to serve as the filtering medium. The small interstices of the fibreglass insulation 54, serve to filter the liquid sulfur and remove fine material such as ash, sand, clay and dirt. In doing so, the fibreglass tends to become somewhat heavy with absorbed liquid sulfur and solids. The fibreglass mat 54 does not have substantial tensile strength and thus would tend to pull apart in its sulfur and solid-laden state, if attempts were made to pull it away. Accordingly, to provide tensile strength, the fibreglass mat 54 must be supported with a fibreglass support layer 56. This support layer 56 must be sufficiently porous so that it permits the liquid sulfur passing through the mat 54 to also pass through layer 56. As shown in FIG. 5, when the fibreglass mat 54 and support layer 56 become sulfur-laden and congested with solid material to the point that filtering action is reduced to a non-efficient level, the support layer 56 and mat 54 can be pulled to one side (to the right as shown in FIG. 5) and fresh mat 54 and layer 56 can be pulled into position under the screen 52 from the roll 58 which is shown at the left side of FIG. 5.

A prototype of the filtering arrangement shown in FIG. 5 has been tested and has been found to be very efficient. Liquid sulfur is a difficult material to handle and a filtering arrangement as described has been found to be trouble-free and surprisingly efficient.

Figure 6:
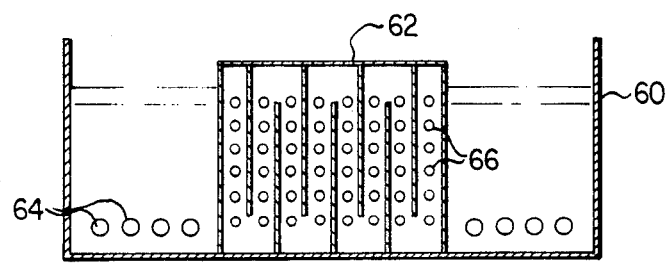
FIG. 6 represents a side elevation cut-away view of a liquid sulfur-steam heat exchanger positioned in a liquid sulfur collecting tank.

In certain situations, it may be advantageous not to have the heat exchanger 8 and the sump 10 separate. FIG. 6 illustrates the manner in which a heat exchanger 62 may be combined with a sump 60 used to collect liquid sulfur melted from the pad or the sulfur block face by means of sulfur sprayed in grid housing 2. There are a number of advantages to this arrangement. The heat lost from the heat exchanger 62 is salvaged because any such loss is into the liquid sulfur that is contained in sump 60. Moreover, steam passing through the coils 64 at the bottom of the sump 60 can be combined with and connected to the steam coils 66 located in the heat exchanger 62. Insulation requirements for the heat exchanger 62 are also reduced. With this arrangement, liquid sulfur tends to remain in liquid condition for a longer period of time than would be the case if the heat exchanger and the sump were separate. Sometimes, steam supply is inadvertently or deliberately shut off and in such cases, the liquid sulfur usually quickly freezes into a solid and considerable time and heat are required in order to remelt the sulfur before operations can continue.

An alternative arrangement is to mount the heat exchanger 8 on the truck 6 so that the heat exchanger 8 and the grid housing 2 can operate as a unit and by means of the truck 6 are readily transportable from site to site. An exterior source of steam can be used to heat the heat exchanger 8 and the grid housing 2.

In operating the apparatus and process described, it is necessary to synchronize the performance of pumps 14 and 18 so that depletions or build-ups in liquid sulfur at any point can be avoided. This can be done with conventional instrumentation. Furthermore, other key operating criteria such as steam and liquid sulfur pressures and temperatures can be automatically synchronized and controlled by suitable conventional instrumentation. It is advisable to keep the instrumentation and controls sealed and separate from the operating components of the apparatus to minimize the build-up of coated sulfur by the instruments. Electrical power used to drive pumps 14 and 18 can be supplied externally from available utility lines. In locations where electrical power is scarce, however, electrical power can be generated by an electrical power generator mounted on the truck 6. Alternatively, equipment such as pumps 14 and 18 can be driven by a power take-off arrangement connected with the engine of the truck 6.

Figure 7:
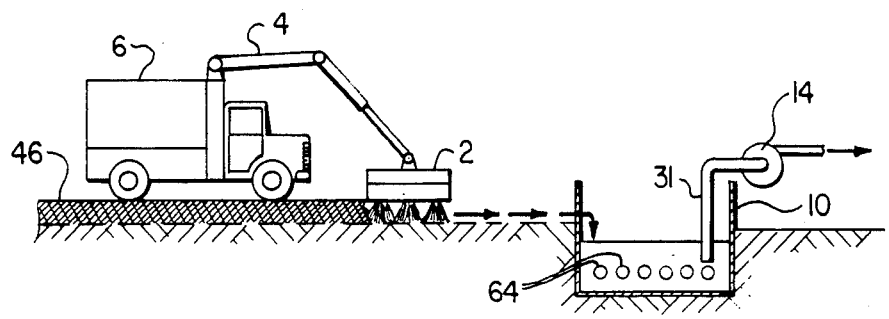
FIG. 7 represents a side elevation view of a grid housing melting solid sulfur from a pad so the liquid sulfur flows by gravity into a liquid sulfur collecting tank.

FIG. 7 represents a side elevation view of a grid housing 2 held and moved by arm 4 of a truck 6 melting away the solid sulfur of pad 46. The melted liquid sulfur flows by gravity to sump 10 which is heated by steam coils 64. The liquid sulfur in the sump 10 is withdrawn from sump 10 by pump 14 and line 31.

Figure 8:
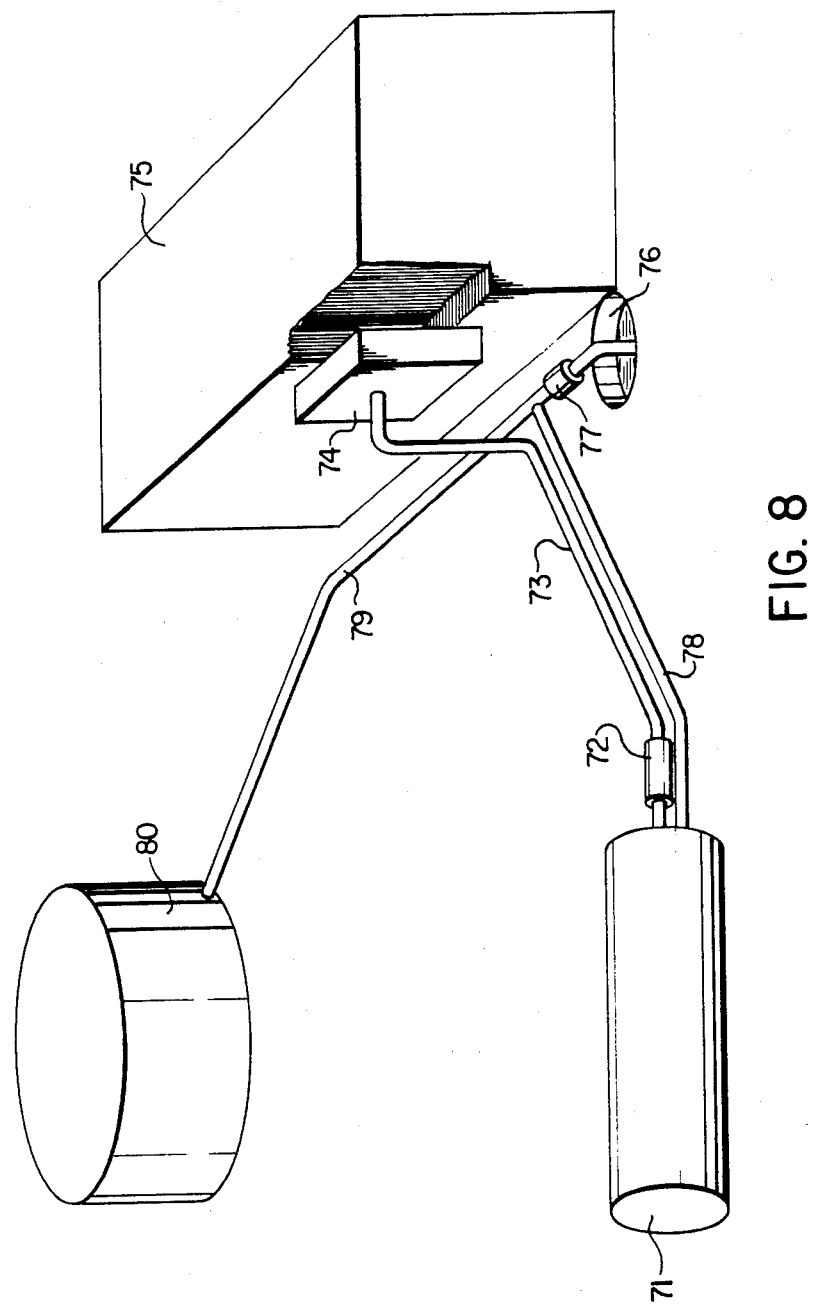
FIG. 8 represents a perspective view of a block sulfur remelting apparatus melting sulfur from the face of a sulfur block.

Referring to FIG. 8, which depicts the manner in which sulfur is melted from the face of a sulfur block, super-heated liquid sulfur generated by and obtained from heat exchanger 71 is pumped under pressure by means of pressure pump 72 along line 73 to spraying grid 74. Viking TM or other pumps suitable for pumping molten materials may be used in the system. Grid 74 faces and is aligned in parallel with one of the side faces of solid sulfur block 75. The grid 74, as described previously, can be held in place and moved about by typical heavy equipment vehicles such as a back-hoe or a truck equipped with a hydraulic arm. Line 73, or a portion thereof, should be flexible to enable the grid 74 to be moved over the face of solid sulfur block 75. The super-heated liquid sulfur that is sprayed under high pressure through the plurality of nozzles (not shown) located in spraying grid 74 against the immediate face of sulfur block 75 melts sulfur from the face of sulfur block 75. The melted sulfur runs down the face of block 75 and is collected in sump 76. A scavenge pump 77 withdraws the liquid sulfur from sump 76. A portion of the withdrawn liquid sulfur is recirculated by means of line 78 through heat exchanger 71 where after it is used again for spraying under pressure against the face of block 75.

The portion of the liquid sulfur drawn from sump 76 that is not recirculated is delivered through line 79 to storage tank 80 for storage purposes. The sulfur stored in tank 80 is maintained in liquid form for delivery to market.

In operation, the degree of super-heat in the super-heated liquid sulfur sprayed onto the face of the block sulfur should be sufficient to supply the heat that is required to melt the sulfur solid and maintain the sprayed liquid sulfur and the melted liquid sulfur in a super-heated condition so that freezing at some point in the system is avoided. The degree of super-heating is controlled by the heat exchanger and the dispersal of heat into the liquid sulfur used for spraying. Moreover, due to the unusual properties of liquid sulfur, super-heating raises the viscosity of the liquid sulfur. By careful regulation, however, a balance can be achieved between increased viscosity and delivery of sufficient heat onto the surface of the sulfur block to melt sulfur from the face of the block.

A prototype of the system described has been designed to melt about 20 tons of sulfur per hour. Sulfur is pumped at a rate of about 300 U.S. gallons per minute and at a temperature of at least 250° F. (115° C.). The super-heated liquid sulfur is impacted on the face of the solid sulfur as a turbulent liquid. Spraying the super-heated liquid sulfur at the sulfur block has been found to be extremely efficient and is much more effective in terms of melting rate and in difficult melting situations, such as melting sulfur pads, than conventional sulfur remelting systems which use a heated metal surface to remelt the sulfur. The designed melt rate of about 20 tons per hour is at least two to three times as rapid as that achieved with the conventional sulfur remelters for equivalent steam and power requirements.

It is estimated that the super-heated liquid sulfur sprayed onto the block face will lose about 5° to 10° F. (2°–50° C.), which will enable both the sprayed and the melted sulfur to comfortably remain in super-heated form. Estimated heat losses to the solid block are based upon an average block temperature of about 39° F., (5° C.), and transient heat conduction through the solid sulfur to the surrounding atmosphere. Any heat losses that occur directly throughout the equipment can be compensated for by circulation throughout the equipment of heat transfer media, preferably steam, by means of adjacent heat lines or runners and the use of insulation such as rigid foam or fibreglass.

The liquid sulfur is typically handled at or close to its lowest viscosity during the pumping and pressurization stages of the procedure. The region of high viscosity and temperatures for super-heated liquid (330° F. to 450° F. (165° C. to 230° C.)) is to be avoided if possible because it raises pumping and heating costs and slows down removal of the melted sulfur. The principle involved is one of providing turbulent impingement of low viscosity liquid sulfur against the face of the sulfur block to promote sufficient heat transfer to melt and coincidentally physically remove a layer of melted sulfur from the surface of the solid block.

The impact spray system of the invention does not normally require the utilization of any further device for spreading or reduction of the sulfur film, except to contain generated sulfur mist. Sulfur mist generated by the system is confirmed by the grid skirt. It may be found advantageous, however, in some cases, to use a secondary spray system to complement the primary system, and even provide an auxiliary mechanical device to assist in spreading the sulfur film and providing agitation against the block surface so as to increase the rate of heat transfer between the super-heated liquid and solid sulfur. This is a variation of the invention that is included in the scope of the invention.

In certain situations, it may be found advantageous to increase the efficiency of the sprayed super-heated liquid sulfur by incorporating into the super-heated liquid sulfur a carrier such as steam, or any gaseous innocuous substance which is inert to sulfur, as determined by the particular requirements of the system. Normally, however, the system as described using merely super-heated liquid sulfur will perform very efficiently. The invention also includes within its scope whatever additional measures may be necessary to minimize the effects of ambient system characteristics, eg. low temperatures in winter time on the sulfur block and the rate of sulfur melting. This may involve, for example, the use of auxiliary heating devices or delivery of additional heat to either the immediate surroundings at the sulfur face or to the sulfur face directly. Frame and plastic or cloth enclosures can also be erected to enclose the block face or pad being melted to minimize the effects of severe low temperatures on the block face and the melting equipment.

The following table details some of the typical calculated process considerations that pertain to the operation of the invention.

TABLE I
SUMMARY OF PROCESS CONSIDERATIONS

| | | |
|---|---|---|
| Heat Losses (MMBTU/HR) | | 0.4  200 ft.$^2$ |
| Total Heat Load (MMBTU/HR) | | 3.6 |
| Dh$_L$ 330 | 265 BTU/= | 18 |
| Sulfur Pump-back | =/HR | 200,000 |
| | USGPH | 14,285 |
| | USGPM | 238 to 250 |
| Net Sulfur Rate | =/HR | 40,000 |
| | USGPH | 2,857 |
| | USGPM | 48 to 50 |
| Gross Pumping Rate @ 265° F. (USGPM) | | 300 |
| Cross Section Velocity for 5 pass exchanger | | |
| fps. $1.5 \times \frac{12.5}{9.5} = 1.97$ fps | | |
| Temperature (°F.) | 330   300 | 265 |
| Effective Viscosity (cpse) | 60    7.5 | 11 |
| Effective Heat Transfer (ht.) | 18    33 | 28 |

The following Example demonstrates the operating conditions and results obtained in conducting a trial test at the Canadian Superior Petroleum Company, Lone Pine, natural gas treatment and sulfur storage facility located about 40 miles north-east of Calgary, Alberta, Canada.

EXAMPLE

A square grid housing measuring five feet per side (25 sq. ft. in area with nine 1-inch nozzles) was tested for sulfur melting performance and efficiency on a solid sulfur pad surface measuring approximately 1½ feet in thickness to ground level. The pad had been left by prior melting of the main sulfur block measuring approximately 15 yards in height by an Ellithorpe remelter. A liquid sulfur spray rate of about 180 Imp. gals./sq.ft./hr. at a temperature of about 150° C. was found to perform very effectively in melting the sulfur pad to ground level. A sulfur pad melt rate of about 170 lbs./sq.ft./hr. was achieved. In equivalent terms the 25 sq.ft. grid housing was found to melt about 4,250 lbs. of sulfur per hour. It was estimated that less than 250,000 BTU's of heat were required to melt about a ton of sulfur using the 25 sq.ft. grid housing. A grid housing measuring 100 or more sq.ft. in area would probably be even more efficient.

After melting the pad to about ground level, and allowing the melted liquid sulfur to run away to the collecting sump, it was found that about 1 to 1½ inches of residue sulfur solidified on the ground due to heat loss into the ground. However, it was found that this residue crust could be readily lifted with a shovel to expose clean uncontaminated earth underneath. Environmental authorities would have no objection to the condition of the uncovered earth. The residue crust was collected and remelted in the sump containing liquid sulfur.

A filter constructed of fibreglass of 8 inches thickness was found to be capable of filtering liquid sulfur at a rate of about 8 tons of liquid sulfur per hour. The filtered sulfur was found to be approximately 99.9 percent pure, which is well above the 99.5 percent purity required for commercial grade liquid sulfur. Moreover, it was found that the fibreglass filter readily removed virtually all ash present in the remelted sulfur. This is particularly attractive for liquid sulfur used in the manufacture of sulfuric acid where residue ash presents a special problem.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. A method of remelting sulfur from the face of solid sulfur block comprising:
   generating super-heated liquid sulfur;
   spraying the super-heated liquid sulfur at above ambient pressures against the face of the sulfur block to thereby melt and physically remove sulfur from the block face; and
   collecting the melted sulfur.

2. A method according to claim 1 wherein the generated liquid sulfur is heated to a temperature of at least 250° F. (120° C.).

3. A method according to claim 1 wherein the generated liquid sulfur is heated to a temperature of at least 275° F. (135° C.).

4. A method according to claim 2 wherein the generated liquid sulfur is sprayed against the sulfur block face under a pressure of at least 75 psig.

5. A method according to claim 1 wherein the collected liquid sulfur is transported to a storage container which maintains the sulfur in liquid form.

6. A method of remelting sulfur from the face of a solid sulfur block comprising:
   generating super-heated liquid sulfur;
   spraying the super-heated liquid sulfur at above ambient pressures against the face of the sulfur block to thereby melt and physically remove sulfur from the block face;
   collecting the melted sulfur in a holding receptacle;
   withdrawing liquid sulfur from the holding receptacle and dividing it into two parts;
   directing the first part to a storage receptacle;
   directing the second part to a heat generating means; and
   heating the liquid sulfur to a super-heated state for use in spraying on the face of the sulfur block.

7. A method according to claim 6 wherein super-heated steam is used to generate the super-heated liquid sulfur.

8. A method according to claim 6 wherein the generated liquid sulfur is heated to a temperature of at least 250° F. (120° C.).

9. A method according to claim 6 wherein the generated liquid sulfur is heated to a temperature of at least 275° F. (135° C.).

10. A method according to claim 6 wherein the generated liquid sulfur is sprayed against the sulfur block face under a pressure of at least 75 psig.

* * * * *